(12) United States Patent
Stent

(10) Patent No.: US 10,866,635 B2
(45) Date of Patent: Dec. 15, 2020

(54) SYSTEMS AND METHODS FOR CAPTURING TRAINING DATA FOR A GAZE ESTIMATION MODEL

(71) Applicant: Toyota Research Institute, Inc., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 105 days.

(21) Appl. No.: 16/130,551

(22) Filed: Sep. 13, 2018

(65) Prior Publication Data

US 2020/0089315 A1 Mar. 19, 2020

(51) Int. Cl.
*G06F 3/01* (2006.01)
*G06T 7/246* (2017.01)
*H04N 5/247* (2006.01)
*G06F 3/16* (2006.01)
*G06N 3/08* (2006.01)

(52) U.S. Cl.
CPC .............. *G06F 3/013* (2013.01); *G06F 3/167* (2013.01); *G06N 3/084* (2013.01); *G06T 7/248* (2017.01); *H04N 5/247* (2013.01)

(58) Field of Classification Search
CPC ...... G06F 3/013; H04N 5/33; H04N 5/23219; G06K 9/00604; G06K 9/0061; G06K 9/033
USPC ........................................................ 382/103
See application file for complete search history.

(56) References Cited

U.S. PATENT DOCUMENTS

| 7,206,435 B2 | 4/2007 | Fijimura et al. |
| 8,986,218 B2 | 3/2015 | De Lemos et al. |
| 9,008,416 B2 | 4/2015 | Movellan et al. |
| 2007/0011609 A1* | 1/2007 | Adjouadi ................ G06F 3/013 715/700 |
| 2014/0361971 A1 | 12/2014 | Sala |
| 2016/0004303 A1* | 1/2016 | Arar ........................ G06F 3/013 345/156 |
| 2016/0202757 A1* | 7/2016 | Miao .................. H04N 5/23219 348/78 |

(Continued)

FOREIGN PATENT DOCUMENTS

| CN | 107748858 A | 3/2018 |
| WO | 99926126 A1 | 5/1999 |
| WO | 2017216118 A1 | 12/2017 |

*Primary Examiner* — Congvan Tran
(74) *Attorney, Agent, or Firm* — Dinsmore & Shohl LLP

(57) ABSTRACT

A method of training a gaze estimation model includes displaying a target image at a known location on a display in front of a subject and receiving images captured from a plurality of image sensors surrounding the subject, wherein each image sensor has a known location relative to the display. The method includes determining a reference gaze vector for one or more eyes of the subject based on the images and the known location of the target image and then determining, with the model, a gaze direction vector of each of the one or more eyes of the subject from data captured by an eye-tracker. The method further includes determining, with the model, an uncertainty in measurement of the gaze direction vector and an error between the reference gaze vector and the gaze direction vector and providing feedback based on at least one of the uncertainty and the error.

20 Claims, 8 Drawing Sheets

(56) References Cited

U.S. PATENT DOCUMENTS

| | | | |
|---|---|---|---|
| 2016/0253044 A1* | 9/2016 | Katz | G06F 3/04842 |
| | | | 345/156 |
| 2017/0180720 A1* | 6/2017 | Jarc | A61B 3/0041 |
| 2017/0261610 A1 | 9/2017 | Scally et al. | |
| 2018/0101989 A1* | 4/2018 | Frueh | G06K 9/00255 |

* cited by examiner

SYSTEMS AND METHODS FOR CAPTURING TRAINING DATA FOR A GAZE ESTIMATION MODEL

TECHNICAL FIELD

The present specification generally relates to gaze estimation systems and methods for determining a gaze direction of a subject and, more specifically, to systems and methods for capturing and providing more robust training data for gaze estimation models used in gaze estimation of a subject, in preparation for situations when it is difficult for the gaze estimation system to estimate the gaze of the subject.

BACKGROUND

Vision is the primary sense with which we perceive the surrounding world. By analyzing where a subject is looking, or in other words tracking the gaze or fixation of a subject, it is possible to learn about the attention, intention, and possible future actions of the subject.

There are two common systems for tracking the gaze of a person. Gaze of a subject may be determined through the use of dedicated devices, such as cameras positioned to view corneal reflections created from infrared or near-infrared light emitters that are positioned to illuminate the eye of the subject. These systems are limited in that the subject's position (e.g., their eyes) must remain in view of both the detectors (e.g., the camera and the light emitters) to produce accurate tracking results. Secondly, wearable trackers are available, but are more intrusive and generally result in low performance. Therefore, to correctly track a subject's gaze, the subject must either wear a device or stay within a relatively small tracking envelope, i.e., in the field of view of both the emitters and the camera.

In automotive applications, vehicles may utilize gaze estimation systems to estimate the gaze of the driver. One or more cameras (e.g., infrared cameras) may be focused on the driver to determine a gaze direction as well as facial expressions of the driver. However, there are instances where the cameras do not have a clear view of the driver's face and cannot determine the gaze of the driver. For example, the driver may have her hand in front of her face, may be squinting, or have her head turned away from the camera. In such instances, the gaze estimation system may not be able to correctly estimate the gaze of the driver at a desired confidence level. Currently, training data for gaze estimation is gathered by positioning a person in front of a large screen and having them follow a dot on the screen. Image data of the user is gathered by tracking the user's gaze. However, this method does not provide training data for situations when it is difficult for the gaze estimation system to estimate the gaze of the subject.

Accordingly, more robust systems and methods for capturing and providing training data for gaze estimation models used in gaze estimation is desirable.

SUMMARY

The present specification relates to systems and methods for capturing and providing more robust training data for gaze estimation models used in gaze estimation of a subject, in preparation for situations when it is difficult for the gaze estimation system to estimate the gaze of the subject. In one embodiment, a method of training a gaze estimation model includes displaying a target image at a known location on a display positioned in front of a subject and receiving images captured from a plurality of image sensors surrounding the subject, wherein each image sensor has a known location relative to the display. The method also includes determining a reference gaze vector for one or more eyes of the subject based on the images and the known location of the target image and then determining, with the gaze estimation model, a gaze direction vector of each of the one or more eyes of the subject from data captured by an eye-tracker. The method further includes determining, with the gaze estimation model, an uncertainty in measurement of the gaze direction vector and an error between the reference gaze vector and the gaze direction vector and providing feedback based on at least one of the uncertainty in measurement and the error.

In another embodiment, a system for training a gaze estimation model includes a display for displaying a target image at a known location thereon, an eye-tracker positioned on or adjacent to the display, a plurality of image sensors configured to capture images of a subject positioned in front of the display, wherein each image sensor has a known location relative to the display and a computing device communicatively coupled to the plurality of image sensors, the display, and the eye-tracker. The computing device includes a processor and a non-transitory computer-readable memory having a machine-readable instruction set stored therein that causes the system to perform a number of method steps when executed by the processor. The method steps at least include receiving images captured from the plurality of image sensors, determining a reference gaze vector for one or more eyes of the subject based on the images and the known location of the target image, determining with the gaze estimation model a gaze direction vector of each of the one or more eyes of the subject from data captured by the eye-tracker, determining with the gaze estimation model an uncertainty in measurement of the gaze direction vector and an error between the reference gaze vector and the gaze direction vector, and providing feedback based on at least one of the uncertainty in measurement and the error.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein include systems and methods for determining gaze direction of a subject. In particular, systems and methods described herein are configured for capturing and providing more robust training data for gaze estimation models used in gaze estimation of a subject, in preparation for situations when it is difficult for the gaze estimation system to estimate the gaze of the subject.

Embodiments described herein instruct the subject to follow a target image on a display, determine a gaze direction of the subject with an eye-tracker and associated uncertainty when the subject looks at the target image, and then determine an error between the measured gaze direction of the subject and the actual gaze direction captured by a number of cameras. The embodiments described herein generate a feedback, auditory or visual, in proportion to the uncertainty and the error, thereby indicating limitations of its ability to measure the gaze direction of the subject. The subject is encouraged to continue to make it difficult for the system to measure the gaze direction by helping generate more and more feedback, in exchange for rewards. The embodiments described herein continuously collect and compile the data generated on the location of the target image, measurements of the gaze direction, as well as the associated uncertainty and error in measurement. Integrating data from situations where the measurement of the gaze direction of the subject incurs large errors or high uncertainty prepares the gaze estimation model to handle a wide variety of situations and makes the gaze estimation system more robust and proficient. As more and more data are fed through the gaze estimation model, patterns begin to arise. This stabilizes the measurement of gaze direction for a given target image and minimizes the uncertainty and error in measurement, especially in situations when it is difficult for the gaze estimation system to estimate the gaze of the subject. Accordingly, a system for training a gaze estimation model is developed and it can be applied to train an eye-tracker used for gaze estimation of drivers of vehicles.

Figure 1:
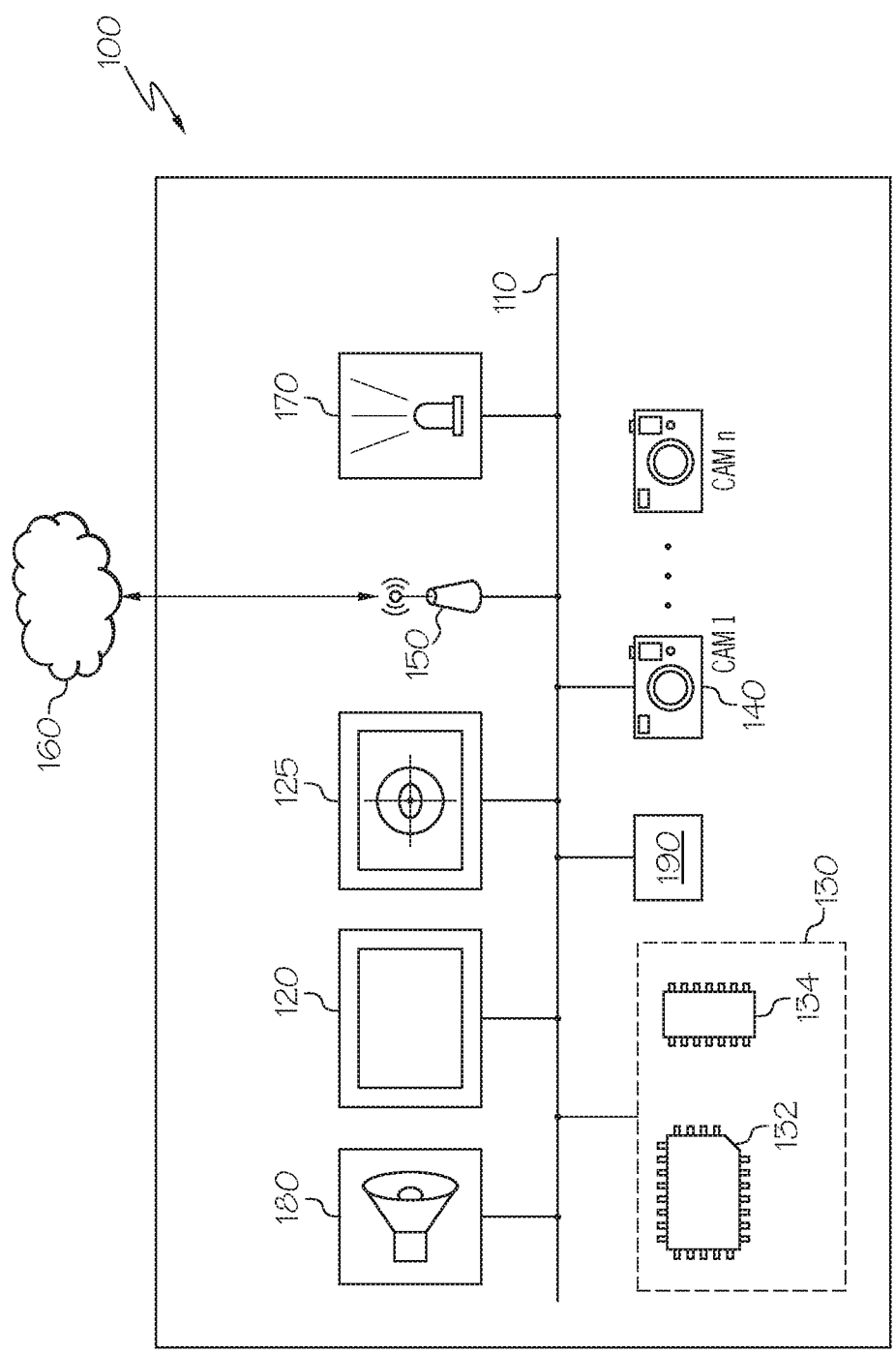
FIG. 1 depicts a system for training a gaze estimation model used in determining the gaze direction of a subject, according to one or more embodiments shown and described herein.

Turning now to the drawings wherein like numbers refer to like structures, and particularly to FIG. 1, a system 100 for training a gaze estimation model is depicted. The system 100 is configured to collect and compile datasets for actively training the gaze estimation model, which is used for measuring the gaze estimation of the subject. In some embodiments, the gaze estimation model is a convolutional neural network, which generates the gaze direction vector based on patterns of data learned from the training dataset, which is compiled using methods discussed herein; in other embodiments, the gaze estimation model is a recurrent neural network.

The system 100 generally includes a communication path 110, a display 120, an eye-tracker 125, a computing device 130 comprising one or more processors 132 and a non-transitory computer-readable memory 134, a plurality of image sensors 140, network interface hardware 150, an infrared (or near-infrared) emitter 170, an output device 180 and an input device 190. The system 100 may be communicatively coupled to a network 160 by way of the network interface hardware 150. The components of the system 100 may be physically coupled or may be communicatively and operably coupled through the communication path 110 and/or the network 160.

The communication path 110 is formed from any medium that is capable of transmitting a signal such as, for example, conductive wires, conductive traces, optical waveguides, or the like. The communication path 110 may also refer to the expanse in which electromagnetic radiation and their corresponding electromagnetic waves traverses. Moreover, the communication path 110 may be formed from a combination of mediums capable of transmitting signals. In one embodiment, the communication path 110 comprises a combination of conductive traces, conductive wires, connectors, and buses that cooperate to permit the transmission of electrical data signals to and from the various components of the system 100 such as the display 120, the eye-tracker 125, the processors 132, the non-transitory computer-readable memory 134, the plurality of image sensors 140, the infrared emitter 170, the input device 190, the output device 180 and the like. Accordingly, the communication path 110 may comprise a bus. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

The display 120 is positioned in front of a subject for displaying a target image at a known location thereon. The communication path 110 communicatively couples the display 120 with other components of the system 100. The display 120 may include any medium capable of transmitting an optical output such as a cathode ray tube, light emitting diodes, a liquid crystal display, a plasma display, or the like. In some embodiments, the display 120 may be configured as a wrap-around screen. In some embodiments, the display 120 may be a television display mounted on a stand or on a wall to project target images (e.g., a single-colored shape, such as a white circle) to a subject. The display 120 may include one or more processors similar to the processor 132 and one or more memories similar to the non-transitory computer-readable memory 134.

The plurality of image sensors 140 are positioned on or adjacent to the display about at least 180-degrees of head yaw of the subject. The plurality of image sensors are synchronized to capture images of the subject from various viewpoints (including but not limited to the eyes and head of the subject) as they look at the target image on the display, as described in more detail with respect to FIGS. 2A and 2B. The plurality of image sensors 140 has a known location relative to the display 120. The plurality of image sensors 140 may be any device having an array of sensing devices (e.g., pixels) capable of detecting radiation in an ultraviolet wavelength band, a visible light wavelength band, or an infrared wavelength band and have any resolution. For example, the plurality of image sensors 140 may be Red-Green-Blue (RGB) cameras capable of capturing a 2D image, a 3D image, or a videostream. The plurality of image sensors 140 may also be an omni-directional camera, or a panoramic camera. In some embodiments, one or more optical components, such as a mirror, fish-eye lens, or any other type of lens may be optically coupled to each of the plurality of image sensors 140. The plurality of image sensors 140 is communicatively coupled to the communication path 110 and to the processors 132.

The eye-tracker 125 is an array of light detectors positioned on or adjacent to the display 120. The eye-tracker 125 is communicatively coupled to the infrared emitter 170. The eye-tracker 125 is used to capture data related to gaze direction of one or more eyes of the subject, through reflection of infrared or light of similar wavelength, from each eye of the subject. The data captured by the eye-tracker 125 is used by the gaze estimation model to measure a gaze direction vector of each eye of the subject. Use of infrared light from the infrared emitter 170 helps to create a data profile that is more readily detectable than visible light reflections off the eye of the subject for gaze estimation purposes, especially when the eye-tracker 125 is used at night.

The computing device 130 may be any device or combination of components comprising the processors 132 and the non-transitory computer-readable memory 134. The processors 132 may be any device capable of executing the machine-readable instruction set stored in the non-transitory computer-readable memory 134. Accordingly, the processors 132 may be an electronic controller, an integrated circuit, a microchip, a computer, or any other computing device. The processors 132 are communicatively coupled to the other components of the system 100 by the communication path 110. Accordingly, the communication path 110 communicatively couples any number of the processors 132 with one another, and allows the components coupled to the communication path 110 to operate in a distributed computing environment. Specifically, each of the components may operate as a node that may send and/or receive data.

The non-transitory computer-readable memory 134 of the system 100 is coupled to the communication path 110 and communicatively coupled to the processors 132. The non-transitory computer-readable memory 134 may comprise RAM, ROM, flash memories, hard drives, or any non-transitory memory device capable of storing a machine-readable instruction set such that the machine-readable instruction set can be accessed and executed by the processors 132. The machine-readable instruction set may comprise logic or algorithm(s) written in any programming language of any generation (e.g., 1GL, 2GL, 3GL, 4GL, or 5GL) such as, for example, machine language that may be directly executed by the processors 132, or assembly language, object-oriented programming (OOP), scripting languages, microcode, etc., that may be compiled or assembled into machine readable instructions and stored in the non-transitory computer-readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer-readable memory 134, other embodiments may include more than one memory module.

The input device 190 is communicatively coupled to the communication path 110 and configured to receive an input from the subject for moving the target image on the display 120. The input device 190 may comprise a keyboard, a joystick, or a mouse, but is not limited as such. The output device 180 is communicatively coupled to the communication path 110 and configured to produce feedback. The feedback may be in the form of one or more distinct and amplifiable signals. The signals could be amplified proportionally based on at least one of a magnitude of the error and a magnitude of the uncertainty in measurement of the gaze direction vector such that the nature and content of the feedback can be indicated. The output device 180 may be an audio speaker, flashing light, but is not limited as such.

Figure 2A:
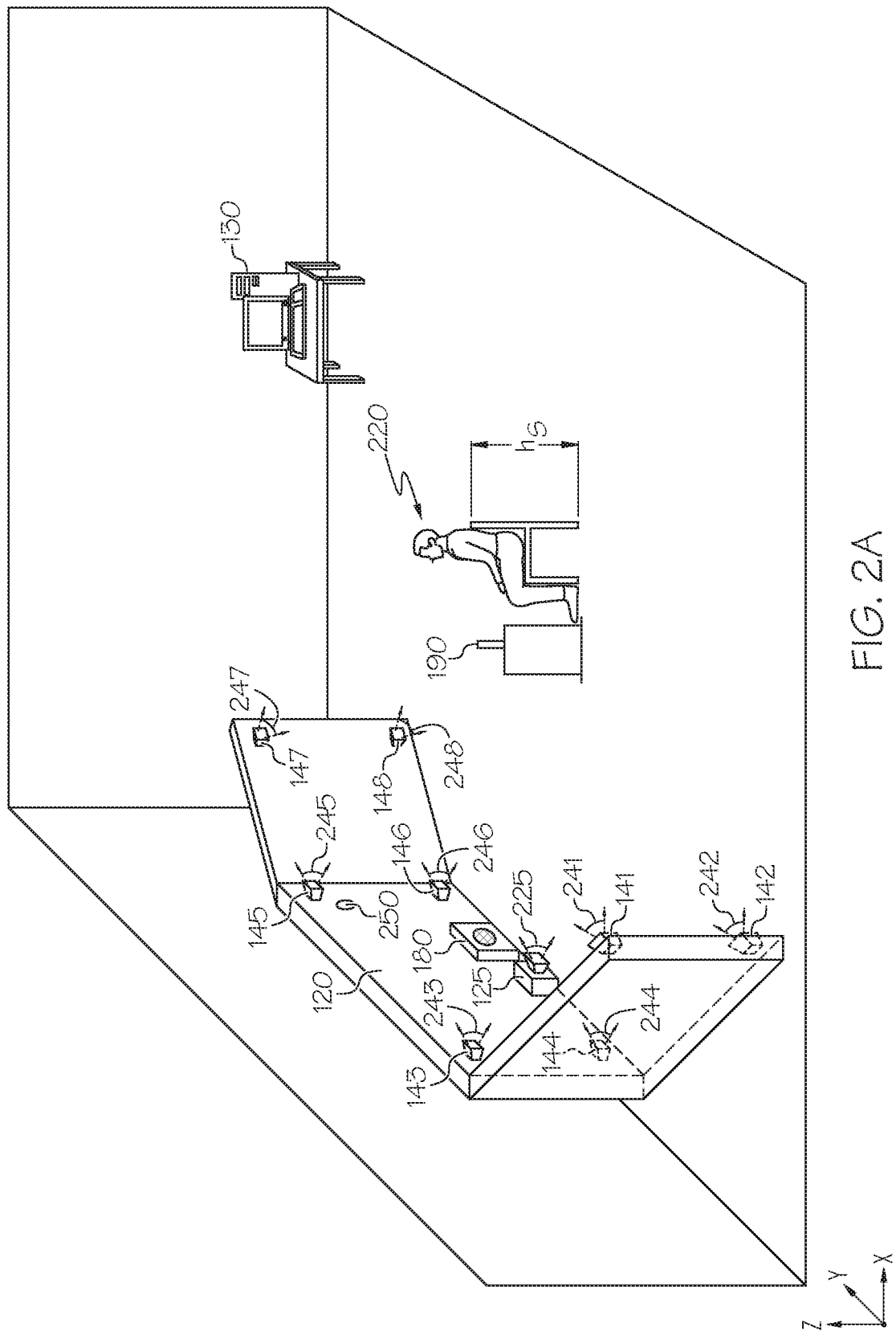
FIG. 2A depicts an isometric view of an illustrative environment of a system for training a gaze estimation model used in determining the gaze direction of a subject, according to one or more embodiments shown and described herein.
Figure 2B:
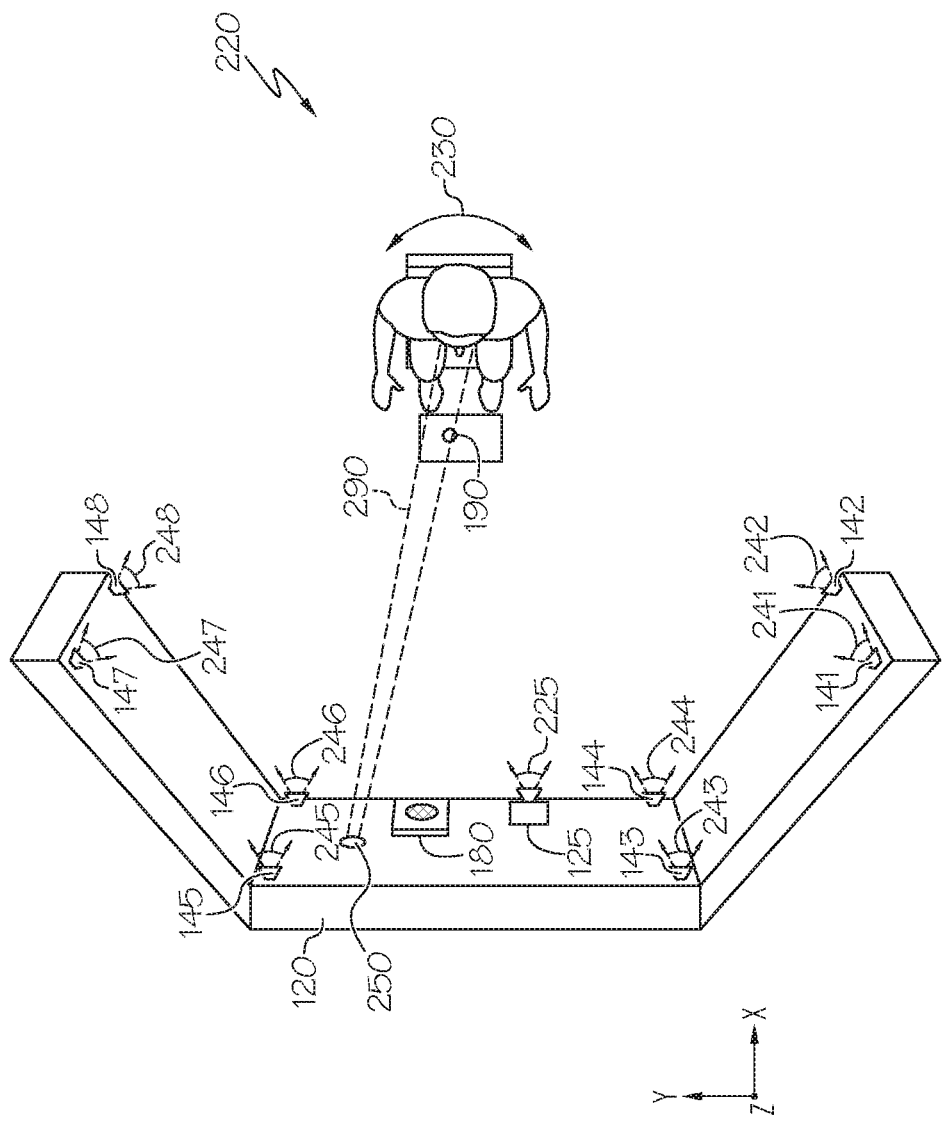
FIG. 2B depicts a top-down view of an illustrative environment of a system for training the gaze estimation model used in determining the gaze direction of a subject, according to one or more embodiments shown and described herein.

Referring now to FIGS. 2A and 2B, an illustrative environment implementing the system 100 is depicted. More specifically, FIG. 2A depicts an isometric view and FIG. 2B depicts a top-down view of an illustrative environment of an example system for training a gaze estimation model. As shown in FIGS. 2A and 2B, the display 120 is positioned at a distance in front of the subject 220 and configured as a wrap-around screen. As a non-limiting example, the display 120 may be an LCD display positioned at a distance between about 80 cm and 200 cm from the subject 220. The processor 132 in the computing device 130 executes a machine-readable instruction set stored in the non-transitory computer-readable memory 134, which causes a target image 250 to be displayed at a known location on the display 120. While in some embodiments, the computing device 130 itself adjusts the location of the target image 250, in other embodiments, the computing device 130 adjusts the location of the target image 250 based on an input from the subject 220 through the input device 190, which is a joystick. Accordingly, the subject 220 changes his or her gaze 290 to the adjusted location of the target image 250 on the display 120.

As depicted in FIGS. 2A and 2B, a number of cameras 141-148 (also referred to generally as a plurality of image sensors 140 in FIG. 1) are placed on the display 120. The cameras 141-148 may be any image sensor capable of producing image data of the subject 220. The system 100 may include fewer than eight image sensors 140 or greater than eight image sensors 140 in other embodiments. The number of image sensors 140 depends on the number required to adequately capture images of the subject 220 about at least 180-degrees of head yaw 230.

The cameras 141-148 are calibrated both intrinsically and extrinsically when the system 100 is setup. Several methods of calibration are possible. Both intrinsic and extrinsic calibration may be performed by moving a black and white checkerboard around in different orientations within the field of view of each of the cameras 141-148 in turn and capturing images simultaneously. Given the known geometry of the checkerboard, and the recovered 2D corner points in the captured images of the checkerboard, the intrinsic parameters of the cameras 141-148 are recovered by optimization to achieve appropriate intrinsic calibration. Given the correspondences between images of the checkerboard taken from the different cameras 141-148 at the same time, the extrinsic parameters (i.e. position and orientation) of the cameras 141-148 are recovered through a standard bundle adjustment optimization to achieve appropriate extrinsic calibration.

Each of the cameras 141-148 is positioned to synchronously capture a unique set of images of the subject 220 from the respective viewpoints 241-248, each of which offer a unique perspective. For example, the cameras 141, 142 143, 144 have left-facing viewpoints 241, 242, 243, 244 respectively to capture the left side of face, eyes, and head of the subject 220, while the cameras 145, 146, 147, 148 have right-facing viewpoints 245, 246, 247, 248 respectively to capture the right side of face, eyes, and head of the subject 220. Thus, the cameras 141-148 surround the subject 220 in a half-ring orientation extending from left-facing viewpoints 241, 242 to right-facing viewpoints 247, 248 about 180-degrees of head yaw 230. Each of the cameras 141-148 have a known location with respect to the display 120 and a target image 250 displayed thereon. The images captured by the cameras 141-148 are then integrated for the purpose of determining the reference gaze vector which is measured from a 3D location of the eye of the subject 220 to the known location of the target image 250 on the display 120. This is performed for each eye of the subject 220 by the computing device 130.

FIGS. 2A and 2B show an eye-tracker 125 with a front-facing viewpoint 225. In some embodiments, the eye-tracker 125 may be coupled to the display 120 as shown in FIGS. 2A-2B, while in other embodiments, the eye-tracker 125 is positioned adjacent to but separate from the display 120. The eye-tracker 125 is calibrated in the same manner as the cameras 141-148 when the system 100 is setup.

One of a variety of coordinate systems such as, but not limited to, a user coordinate system (UCS), may be implemented to spatially orient the eye-tracker 125. The UCS has its origin at the center of the front surface of the eye-tracker 125. In some embodiments, the origin is defined at the center of the front surface (e.g., the eye-tracking camera lens) of the eye-tracker 125 so that the gaze direction vector may be defined with respect to the location of the origin. Furthermore, when spatially orienting the eye-tracker 125, all other objects including the plurality of image sensors 140 may be localized with respect to the location of the origin of the eye-tracker 125. In some embodiments, an origin of the coordinate system may be defined at a location on the subject, for example, at a spot between the eyes of the subject. Irrespective of the location of the origin for the coordinate system, a calibration step, as described in more detail herein, may be employed by the eye-tracker 125 to calibrate a coordinate system for capturing data for training the gaze estimation model.

The eye-tracker 125 is positioned to capture and track the motion of the gaze 290 of the subject 220 as the target image 250 is displayed and moved from location to location on the display 120. The data captured by the eye-tracker 125 is used by a gaze estimation model to measure the gaze direction vector of each eye of the subject 220. Based on at least one of the uncertainty in measurement of the gaze direction vector and the error between the reference gaze vector and the gaze direction vector as described in further detail below, an auditory feedback is generated through the output device 180 placed on or adjacent to the display 120 such that the subject 220 can clearly receive the feedback and respond accordingly.

Figure 3:
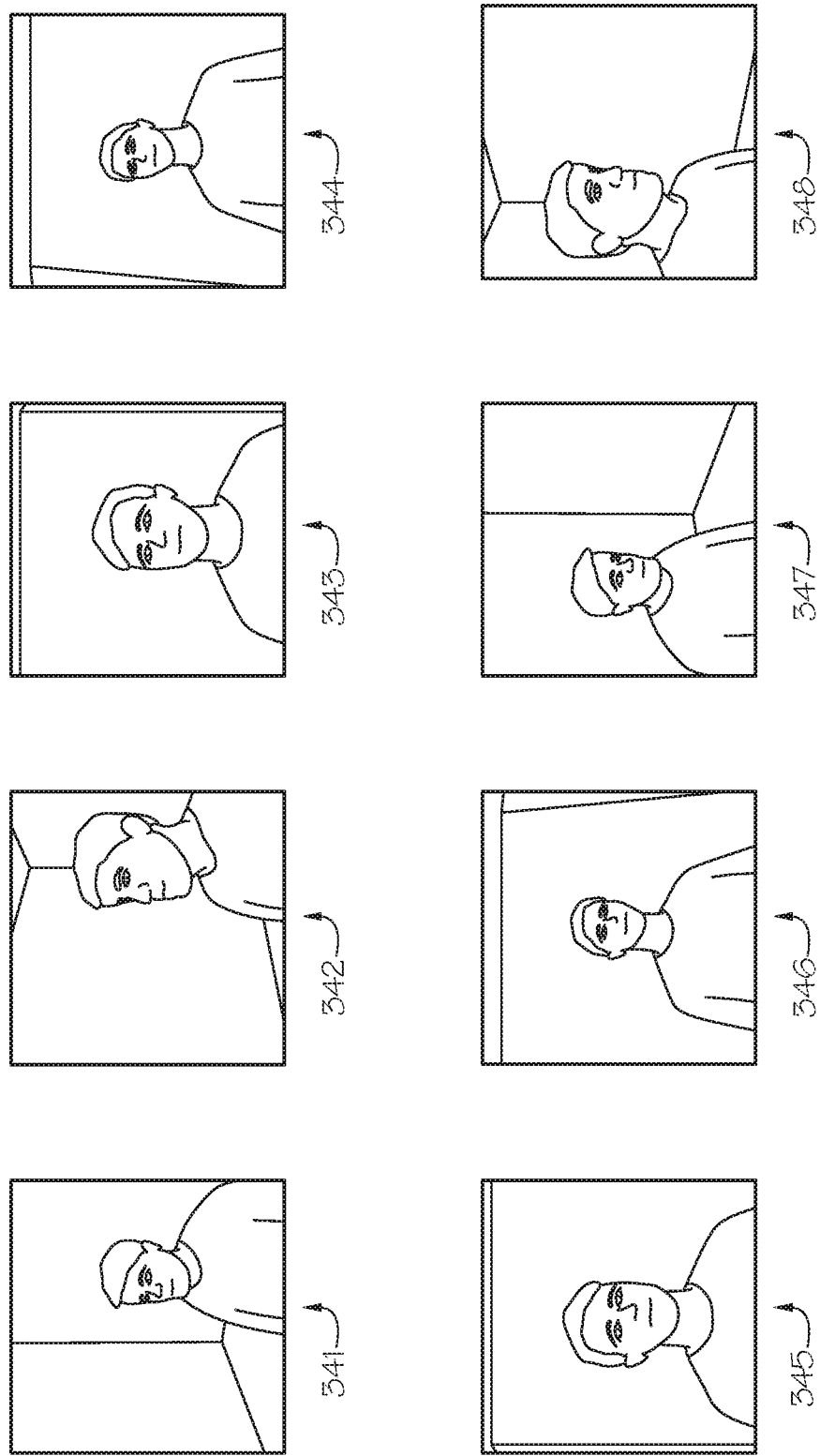
FIG. 3 depicts illustrative line drawings of images collected from a plurality of cameras in the system for training the gaze estimation model, according to one or more embodiments shown and described herein.

Referring now to FIG. 3, illustrative line drawings of images collected from the plurality of cameras 141-148 from respective viewpoints 241-248 are depicted. For example, images 341-348 are line drawing representations of images captured from the cameras 141-148, respectively. The images 341-348 represent a set of synchronous images from the left-facing viewpoints 241, 242 to right-facing viewpoints 247, 248 about 180-degrees of head yaw 230. Each of the images 341-348 may be registered in the environment and the reference gaze vector is determined based on the images and the known location of the target image 250.

Figure 4:
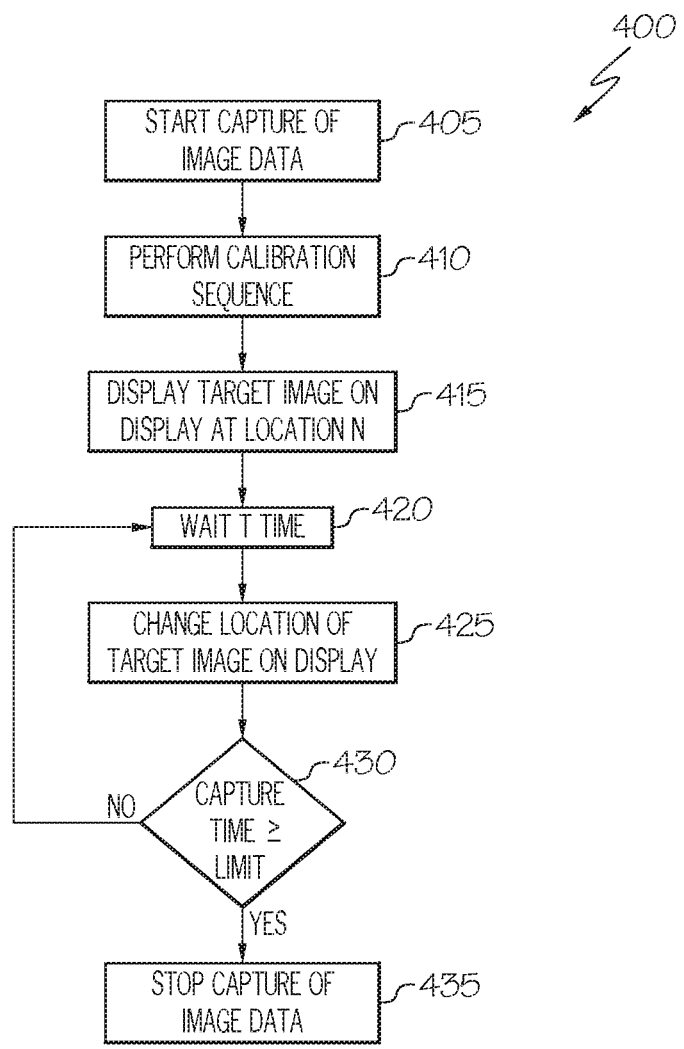
FIG. 4 depicts a flow diagram of a method of capturing images for determining a reference gaze vector with the system, according to one or more embodiments shown and described herein.

Referring now to FIG. 4, a flow diagram 400 of a non-limiting method of capturing images for determining the reference gaze vector for each eye of the subject 220 is depicted. In block 405, the cameras are setup to capture images at a specified frequency. The frequency may be between about 1 Hz and about 12 Hz, or other frequency determined from the number of images to be collected during a capture session. For example, for a 3-minute capture session (180 seconds) and a 6 Hz frequency, each of the cameras 141-148 will capture about 1080 images. In block 410, the system 100 performs a calibration sequence on the cameras 141-148. The calibration sequence may include the calibration method described above. In block 415, the capture sequence is initiated. The capture sequence is initiated by projecting the target image 250 on the display 120 at a location n (e.g., a first location) for a period of time, T, as determined in block 420. For example, the period of time T may be between about 1 second and about 5 seconds. Other periods of time may be determined to provide sufficient time to capture images of the subject 220 while viewing the target image 250. In block 425, once the period of time T lapses, the computing device 130 exits the capture sequence method and changes the location of the target image 250 on the display 120 to a location different than the previous location n. In block 430, the method determines whether the total capture time for the images has lapsed. For example, if the total capture time is defined to be 3 minutes and the location of the target image 250 is changed every 2 seconds, then block 430 will determine whether the total capture time has lapsed the defined 3 minutes (or 90 iterations of updating the location of the target image 250). If the total capture time has not lapsed, then the method will continue to block 420 and again update the location n of the target image 250 until the period of time T lapses. If the total capture time has lapsed, in block 435, the cameras 141-148 stop the capture of images. As a result, the images are synchronously captured by the cameras 141-148 from the viewpoints 241-248.

As noted above, the system 100 can be advantageously used to collect and compile more robust training data for gaze estimation models. In the embodiment shown in FIGS. 2A-2B, the subject 220 is first seated in front of the display 120 and positioned to provide input through the input device 190. In other embodiments, the subject 220 may be free to move around in the space in front of the display 120 towards and away from the display 120 as long as the subject 220 is within the field of view of at least one of the cameras 141-148 and the eye-tracker 125. The computing device 130 determines an initial position of the target image 250 on the display 120 and projects the target image 250 at that position accordingly. The computing device 130 then instructs the subject 220 to look at the target image 250 such that it is difficult to estimate her gaze direction.

As the subject 220 looks at the target image 250, the cameras 141-148 synchronously capture images of the face, each eye, and the head of the subject 220 from left-facing viewpoints 241, 242 to right-facing viewpoints 247, 248 about 180-degrees of head yaw 230 of the subject 220. Each of the cameras 141-148 as well as the eye-tracker 125 has a known location relative to the display 120. The images are received by the computing device 130 through the communication path 110.

The processor 132 in the computing device 130 processes the images using one or more image processing algorithms. Any known or yet-to-be developed video and image processing algorithms may be applied to the images in order to identify an item or determine a location of an item relative to other items in an environment. Example video and image processing algorithms include, but are not limited to, kernel-based tracking (mean-shift tracking) and contour processing algorithms. In general, video and image processing algorithms may detect objects and movement from sequential or individual frames of images. One or more object recognition algorithms may be applied to the images to estimate three-dimensional objects to determine their locations relative to each other. For example, structure from motion, which is a photogrammetric range imaging technique for estimating three-dimensional structures from image sequences, may be used. Additionally, any known or yet-to-be-developed object recognition algorithms may be used to extract the objects, edges, dots, bright spots, dark spots or even optical characters and/or image fragments from the images. For example, object recognition algorithms may include, but are not limited to, scale-invariant feature transform ("SIFT"), speeded up robust features ("SURF"), and edge-detection algorithms.

Figure 5:
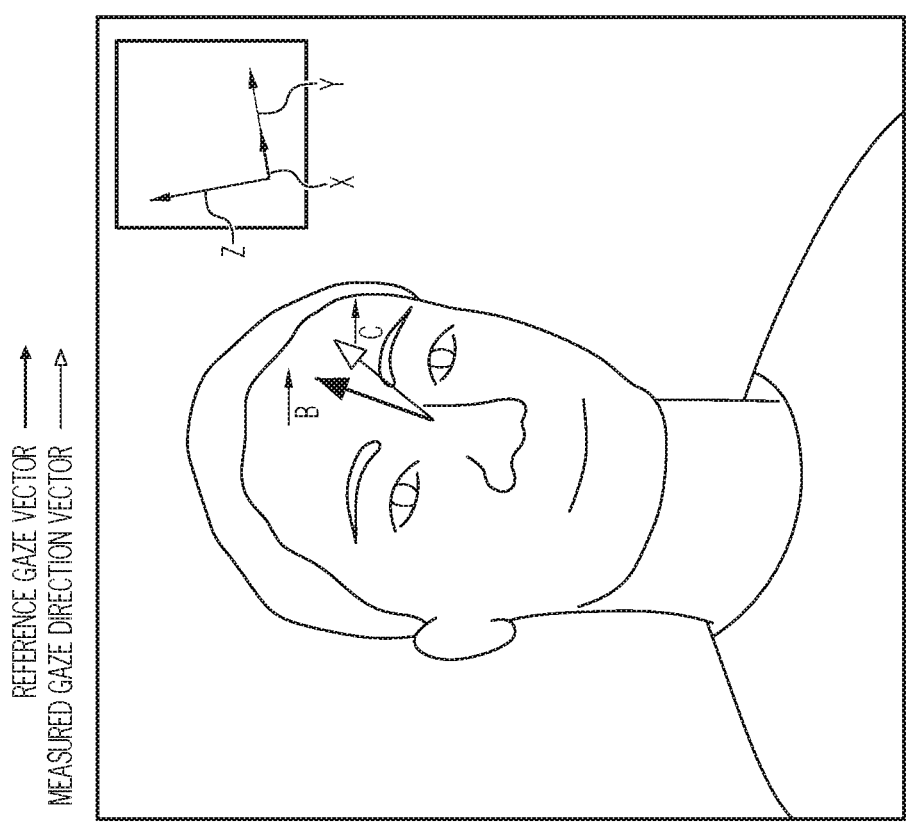
FIG. 5 depicts an illustrative line drawing representing the reference gaze vector and a gaze direction vector determined by the system, according to one or more embodiments shown and described herein.

FIG. 5 shows an illustrative line drawing representing the reference gaze vector $\vec{B}$ generated by the images from the cameras 141-148 and the gaze direction vector $\vec{C}$ of the subject 220 measured using the gaze estimation model from the data captured by the eye-tracker 125. Additionally, the estimated head appearance is illustrated in the upper right corner of FIG. 5.

Figure 6A:
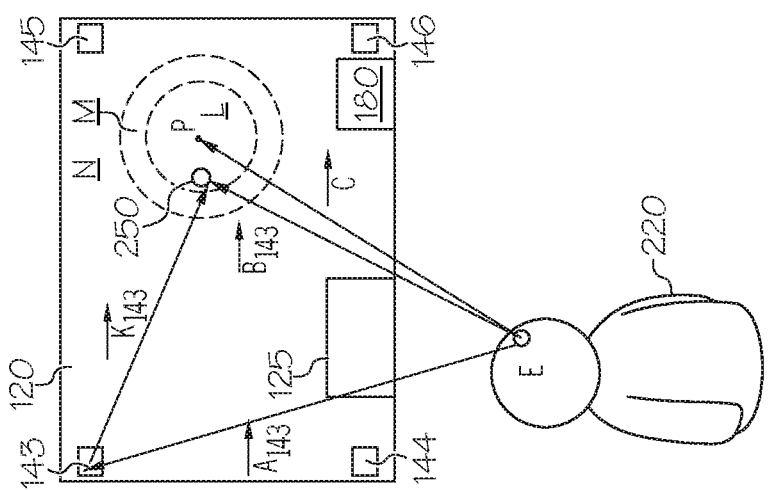
FIGS. 6A-6C show illustrative measurements obtained from the outputs of the system for training the gaze estimation model, according to one or more embodiments shown and described herein.
Figure 6B:
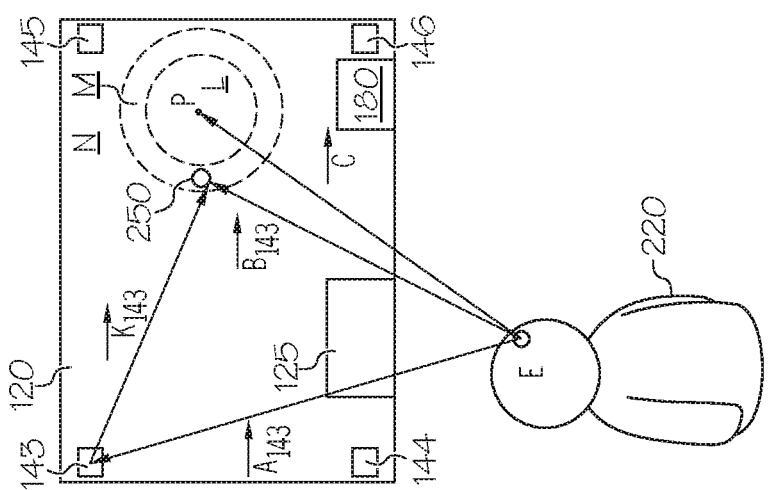
Figure 6C:
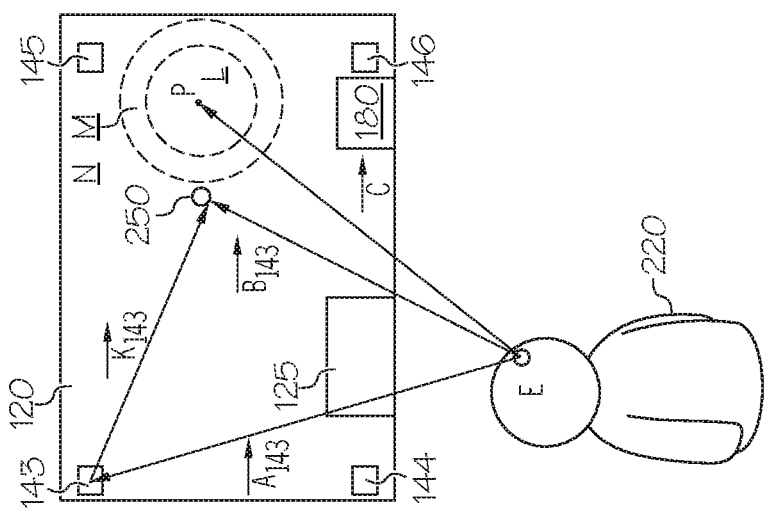

FIGS. 6A-6C show illustrative measurements obtained from the outputs of the system for training the gaze estimation model, which comprise the reference gaze vector $\vec{B}$ and the gaze direction vector $\vec{C}$. The images from the cameras 141-148 are used to determine a known 3D location of one or both the eyes of the subject 220. The reference gaze vector $\vec{B}$ for each eye of the subject 220 is the determined by the computing device 130 based on the images from the cameras 141-148 and the known location of the target image 250. For example, referring to FIGS. 6A-6C, since the location of the camera 143 relative to the display 120 and the location of the target image 250 on the display 120 are known, the vector representing the location of the target image 250 relative to the camera 143 is known and fixed as a constant, $\overrightarrow{K_{143}}$. The camera 143 is configured to determine the location of the subject 220 having eye E. Accordingly, the vector representing the location of the eye E relative to the camera 143 is determined as $\overrightarrow{A_{143}}$. Therefore, the vector representing the location of the eye E relative to the target image 250 can be determined as $\overrightarrow{B_{143}}$ by the following equation:

$$\overrightarrow{B_{143}} = \overrightarrow{A_{143}} + \overrightarrow{K_{143}} \tag{i}$$

Similarly, for each of the cameras 141, 142, 144-148, the vector representing the location of the eye E relative to the target image 250 can be determined by the following equation:

$$\overrightarrow{B_i} = \overrightarrow{A_i} + \overrightarrow{K_i} \tag{ii}$$

where i=141, 142, 143, 144, 145, 146, 147, 148.

Therefore, the reference gaze vector $\vec{B}$ representing the true gaze direction is determined by aggregating the vectors obtained from images captures by each of the cameras 141-148, as shown in the following equation:

$$\vec{B} = \Sigma \overrightarrow{B_i} = \Sigma \overrightarrow{A_i} + \Sigma \overrightarrow{K_i} \tag{iii}$$

where i=141, 142, 143, 144, 145, 146, 147, 148.

As the subject 220 looks at the target image 250, the eye-tracker 125 also captures data based on reflection of infrared, from each eye E of the subject 220. The computing device 130 measures a gaze direction vector $\vec{C}$ of each eye E of the subject 220 (depicted in FIGS. 6A-6C) based on the data captured by the eye-tracker 125 using the gaze estimation model. The gaze estimation model is configured to account for self-occlusion, lighting variation and facial distortions, when measuring the gaze direction vector. The computing device 130 also determines an uncertainty in measurement U of the gaze direction vector $\vec{C}$ and an error Q between the reference gaze vector $\vec{B}$ and the gaze direction vector $\vec{C}$.

According to the National Institute of Standards and Technology (NIST), the error in measurement is defined as the difference between the result of the measurement and the value of the measurand. Similarly, according to the NIST, the uncertainty in measurement is defined as a parameter, associated with the result of the measurement that characterizes the dispersion of the values that could reasonably be attributed to the measurand. In this case, the error Q is measured by the modulus value of the difference between the reference gaze vector $\vec{B}$ and the gaze direction vector $\vec{C}$, as shown in the following equation:

$$Q = |\vec{B} - \vec{C}| \tag{iv}$$

The uncertainty in measurement U of the gaze direction vector $\vec{C}$ can be measured to incorporate (a) uncertainty $U_E$ due to environmental factors and (b) uncertainty $U_P$ due to imperfectly estimated model parameters as shown in the following equation, where p and q are constants:

$$U = p*U_E + q*U_P \tag{v}$$

The uncertainty $U_E$ due to environmental factors can be estimated using a mathematical expression modeling an estimated gaze distribution which is proportional to the uncertainty $U_E$ due to environmental factors. The uncertainty $U_E$ due to environmental factors can be significant if, for example, the subject 220 moves away from the eye-tracker 125 or the eyes E of the subject 220 are covered. On the other hand, the uncertainty $U_P$ due to imperfectly estimated model parameters depends on the accuracy of the training data used to determine the model parameters of the gaze estimation model. The uncertainty $U_P$ due to imperfectly estimated model parameters can be estimated using techniques well-known in the art such as, but not limited to, dropout variational inference or evaluation of an ensemble of parallel networks to determine their level of agreement with respect to model parameters.

Based on at least one of the uncertainty in measurement U of the gaze direction vector $\vec{C}$ and the error Q between the reference gaze vector $\vec{B}$ and the gaze direction vector $\vec{C}$, the computing device 130 generates an auditory feedback through the output device 180. The auditory feedback is generated based on the error Q and the uncertainty in measurement U. The auditory feedback is proportional to the magnitude of the error Q and a magnitude of the uncertainty in measurement U. For example, a greater magnitude in error Q and uncertainty in measurement U generates a louder sound, while a corresponding lesser magnitude generates a softer sound. The sound generated as auditory feedback corresponding to the magnitude of the error Q is distinct from the sound generated as auditory feedback corresponding to the magnitude of the uncertainty in measurement U. For example, the sound corresponding to the error Q may be an alarm bell and the sound corresponding to the uncertainty in measurement U may be a phone ring.

FIGS. 6A-6C also depicts three situations based on the measurement of the gaze direction vector $\vec{C}$. The three situations generate three different sounds as auditory feedback depending on whether the error Q is substantially high or low and whether the uncertainty in measurement U is substantially high or low. L, M, and N denote three different regions around the point P, where the gaze direction vector $\vec{C}$ intersects the display 120.

Within the circular region L surrounding the point P, the measurement of the gaze direction vector $\vec{C}$ has low error Q and low uncertainty U. Thus, the feedback generated when the target image 250 is in the region L (shown as FIG. 6A) may be in the form of soft but distinct sounds. When the point P almost coincides with the target image 250, the feedback generated may not be perceptible since the error Q and the uncertainty in measurement U are low. Similarly, when the point P exactly coincides with the target image 250, there is no feedback generated since the measured gaze direction vector $\vec{C}$ accurately and precisely captures the gaze 290 of the subject 220.

Within the annular region M surrounding the point P, the measurement of the gaze direction vector $\vec{C}$ may have a substantially high error Q with low uncertainty U or a low error Q with a substantially high uncertainty U. Thus, when the target image 250 is in the annular region M (shown in FIG. 6B), the feedback generated is more perceptible since either the error Q is substantially high or alternatively, the uncertainty in measurement U is substantially high. Accordingly, the feedback may be generated as distinct sounds that are louder than when the target image 250 is in region L.

Within the region N, the measurement of the gaze direction vector $\vec{C}$ has a substantially high error Q and a substantially high uncertainty U since the measured gaze direction vector $\vec{C}$ is farthest away from the target image 250. Thus, when the target image is in the region N (shown in FIG. 6C), the feedback generated is significant and easily perceptible since both the error Q and the uncertainty in measurement U are substantially high. Accordingly, the feedback may be generated as distinct sounds that are still louder than when the target image 250 is in region M.

Based on the auditory feedback, the subject 220 selects a new location of the target image 250 on the display 120 using the input device 190. The computing device 130 adjusts the location of the target image 250 based on the input from the subject 220. The subject 220 is encouraged to select locations of the target image 250 such that the eye-tracker 125 would have difficulty in determining her gaze direction while looking at the target image 250. In other words, the subject is incentivized to select locations of the target image 250 such that the error Q is above an error threshold or the uncertainty in measurement U is above an uncertainty threshold. For example, the subject may make faces, squint, close one eye, put a hand partially over her face, shine a bright light on part of her face, etc. such that the output device 180 produces the auditory feedback continuously due to either the error Q exceeding the error threshold or the uncertainty in measurement U exceeding the uncertainty threshold.

Alternatively, based on internal determination, the computing device 130 may adjust the location of the target image 250 on the display to a region where the error Q is above the error threshold or the uncertainty in measurement U is above the uncertainty threshold. The computing device 130 may, accordingly, instruct the subject 220 to follow the new location of the target image 250. The location of the target image 250 is adjusted based on the auditory feedback.

The computing device 130 collects and compiles a new training dataset by associating the data captured by the eye-tracker 125 with the corresponding images from the cameras 141-148 as well as the uncertainty in measurement U and the error Q between the reference gaze vector $\vec{B}$, determined using the method described above, and the gaze direction vector $\vec{C}$. The computing device 130 retrains the gaze estimation model by updating one or more parameters of the gaze estimation model with the new training dataset. The update can be performed in several different ways such as, but not limited to, retraining the gaze estimation model from scratch with the new training dataset, fine-tuning the existing training data in the gaze estimation model with the new training dataset or a weighted version of the new training dataset, or extending the gaze estimation model in the manner of progressive neural networks before retraining with the new training dataset. The update is carried out by error backpropagation using one of a suite of gradient-based optimization methods such as, but not limited to, stochastic gradient descent or Adam.

Figure 7:
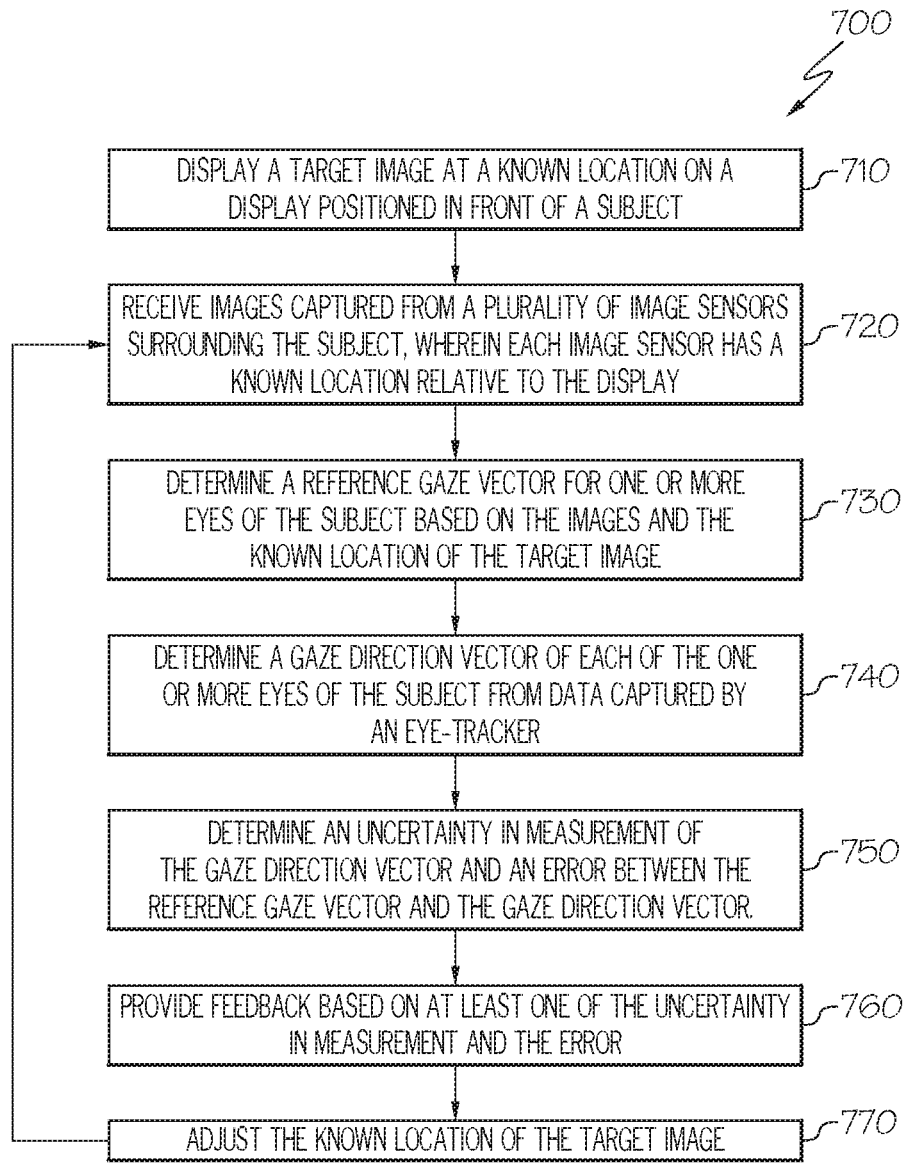
FIG. 7 depicts a flow diagram for a method of training a gaze estimation model, according to one or more embodiments shown and described herein.

Referring now to FIG. 7, a block diagram 700 for a method of training a gaze estimation model is shown. In block 710, a target image is displayed by a computing device at a known location on a display positioned in front of a subject. The display screen may be configured as a wrap-around screen from a left-facing viewpoint to a right-facing viewpoint of the subject about at least 180-degrees of head yaw. A plurality of image sensors, an eye-tracker and an audio speaker are positioned on or adjacent to the display. The plurality of image sensors as well as the eye-tracker have a known location relative to the display. In some embodiments, the plurality of image sensors may be an RGB camera configured to capture a 2D image, a 3D image, or a videostream. The computing device instructs the subject to look at the target image such that it is difficult to estimate her gaze.

In block 720, images captured synchronously from each of the plurality of image sensors are received by the computing device. In block 730, the computing device determines a reference gaze vector for one or more eyes of the subject based on the images and the known location of the target image on the display. In block 740, the computing device measures a gaze direction vector of each of the one or more eyes of the subject with data captured by the eye-tracker. A gaze estimation model is used to measure the gaze direction vector. In some embodiments, the gaze estimation model is convolutional neural network; in other embodiments, the gaze estimation model is a recurrent neural network. In block 750, the computing device determines an uncertainty in measurement of the gaze direction vector and an error between the reference gaze vector and the gaze direction vector.

In block 760, the computing device provides feedback based on at least one of the uncertainty in measurement of the gaze direction vector and the error between the reference gaze vector and the gaze direction vector. In some embodiments, the feedback is an auditory feedback generated by an audio speaker communicatively connected to the computing device and positioned on or adjacent to the display. In some embodiments, the feedback may be generated when the error is above an error threshold or the uncertainty in measurement of the gaze direction vector is above an uncertainty threshold. The feedback is proportional to at least one of a magnitude of the error and a magnitude of the uncertainty in measurement of the gaze direction vector. The feedback corresponding to the magnitude of the error is distinct from the feedback corresponding to the magnitude of the uncertainty in measurement of the gaze direction vector.

In block 770, the computing device adjusts the known location of the target image. In some embodiments, the location of the target image is adjusted to a region of the display such that the error between the reference gaze vector and the gaze direction vector is above the error threshold or the uncertainty in measurement of the gaze direction vector is above the uncertainty threshold. In other embodiments, the computing device receives an input from the subject and adjusts the known location of the target image in accordance with the input. The subject is encouraged to "fool" the gaze estimation system by selecting the input such that the eye-tracker has difficulty in determining his or her gaze while looking at the target image. In other words, the subject is incentivized to select the input such that the error between the reference gaze vector and the gaze direction vector is above the error threshold or the uncertainty in measurement of the gaze direction vector is above the uncertainty threshold. For example, the subject may be assigned a financial reward for selecting inputs that (i) increase the number of erroneous and/or uncertain measurements and/or, (ii) increase the magnitude of error or the magnitude of uncertainty in measurement.

The computing device then provides an instruction to the subject to look at the target image with the adjusted known location. The step in block 770 loops back into the step 720, where the computing device receives images captured from the plurality of image sensors when the subject looks at the target image with the adjusted known location.

The subject receives feedback, for example, from the audio speaker based on how accurately and precisely the eye-tracker measures the gaze estimation vector. The subject may receive increased feedback indicating that the magnitude of the error and the uncertainty in measurement is substantially high, moderate feedback indicating that the magnitude of the error or the uncertainty in measurement is substantially high or decreased (or none) feedback indicating that the error is low and the uncertainty in measurement is low. The computing device updates one or more parameters of the gaze estimation model with a new training dataset formed by associating the data captured by the eye-tracker with the images from the plurality of image sensors. As a result, the gaze estimation model improves its ability to measure the gaze estimation vector with higher accuracy and precision, thus becoming more robust and proficient.

The systems and methods used can be utilized to train any gaze estimation model to accurately and precisely estimate the gaze of a person, particularly when it is difficult to determine. Additionally, the new training dataset generated can be used to train any gaze estimation model used in a different gaze estimation system as well as any of the plurality of image sensors used herein for the purposes of improving their gaze estimation ability. Accordingly, any gaze estimation model becomes more robust and proficient by the use of the systems and methods described herein.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of training a gaze estimation model, the method comprising:
    displaying a target image at a known location on a display positioned in front of a subject;
    receiving images captured from a plurality of image sensors surrounding the subject, wherein each image sensor has a known location relative to the display;
    determining a reference gaze vector for one or more eyes of the subject based on the images and the known location of the target image;
    determining, with the gaze estimation model, a gaze direction vector of each of the one or more eyes of the subject from data captured by an eye-tracker;
    determining, with the gaze estimation model, an uncertainty in measurement of the gaze direction vector and an error between the reference gaze vector and the gaze direction vector; and
    providing feedback based on at least one of the uncertainty in measurement and the error.

2. The method of claim 1, wherein each image sensor is an RGB camera configured to capture at least one of the following: a 2D image, a 3D image, or a videostream.

3. The method of claim 1, wherein the feedback is provided when the error is above an error threshold or the uncertainty in measurement of the gaze direction vector is above an uncertainty threshold.

4. The method of claim 1, wherein the feedback is proportional to at least one of a magnitude of the error and a magnitude of the uncertainty in measurement of the gaze direction vector.

5. The method of claim 1, wherein the feedback corresponding to the magnitude of the error is distinct from the feedback corresponding to the magnitude of the uncertainty in measurement of the gaze direction vector.

6. The method of claim 1, wherein the feedback is an auditory feedback.

7. The method of claim 1 further comprising:
    adjusting the known location of the target image to a region of the display such that the error is above an error threshold or the uncertainty in measurement of the gaze direction vector is above an uncertainty threshold; and
    updating one or more parameters of the gaze estimation model with a new training dataset formed by associating the data captured by the eye-tracker with the images from the plurality of image sensors.

8. The method of claim 1 further comprising:
receiving an input from the subject to adjust the known location of the target image;
adjusting the known location of the target image on the display in accordance with the input; and
updating one or more parameters of the gaze estimation model with a new training dataset formed by associating the data captured by the eye-tracker with the images from the plurality of image sensors.

9. The method of claim 8 further comprising:
assigning a reward to the subject for selecting the input such that the error is above an error threshold or the uncertainty in measurement of the gaze direction vector is above an uncertainty threshold.

10. The method of claim 1 further comprising collecting training data including one or more of the images, the error, and the uncertainty in measurement of the gaze direction vector.

11. The method of claim 10 further comprising retraining the gaze estimation model using the training data.

12. The method of claim 1, wherein the gaze estimation model is configured to account for self-occlusion, lighting variation and facial distortions, when measuring the gaze direction vector.

13. The method of claim 1, wherein the gaze estimation model comprises a recurrent neural network or a convolutional neural network.

14. A system for training a gaze estimation model comprising:
a display for displaying a target image at a known location thereon;
an eye-tracker positioned on or adjacent to the display;
a plurality of image sensors configured to capture images of a subject positioned in front of the display, wherein each image sensor has a known location relative to the display;
a computing device communicatively coupled to the plurality of image sensors, the display, and the eye-tracker, the computing device comprising a processor and a non-transitory computer-readable memory; and
a machine-readable instruction set stored in the non-transitory computer-readable memory that causes the system to perform at least the following when executed by the processor:
receive images captured from the plurality of image sensors;
determine a reference gaze vector for one or more eyes of the subject based on the images and the known location of the target image;
determine, with the gaze estimation model, a gaze direction vector of each of the one or more eyes of the subject from data captured by the eye-tracker;
determine, with the gaze estimation model, an uncertainty in measurement of the gaze direction vector and an error between the reference gaze vector and the gaze direction vector; and
provide feedback based on at least one of the uncertainty in measurement and the error.

15. The system of claim 14, wherein the display is configured as a wrap-around screen from a left facing viewpoint to a right facing viewpoint of the subject about at least 180-degrees of head yaw.

16. The system of claim 14 further comprising an input device communicatively coupled to the computing device and configured for selecting and controlling the position of the target image on the display.

17. The system of claim 14 further comprising an output device communicatively coupled to the computing device and configured to emit one or more amplifiable signals as feedback based on at least one of the uncertainty in measurement and the error.

18. The system of claim 17, wherein the one or more signals can be amplified proportionally based on at least one of a magnitude of the error and a magnitude of the uncertainty in measurement of the gaze direction vector.

19. The system of claim 17, wherein the output device is an audio speaker configured to emit one or more amplifiable sounds.

20. The system of claim 14, wherein the gaze estimation model is a recurrent neural network or a convolutional neural network.

* * * * *

UNITED STATES PATENT AND TRADEMARK OFFICE
CERTIFICATE OF CORRECTION

| | | |
|---|---|---|
| PATENT NO. | : 10,866,635 B2 | Page 1 of 1 |
| APPLICATION NO. | : 16/130551 | |
| DATED | : December 15, 2020 | |
| INVENTOR(S) | : Simon A. I. Stent | |

It is certified that error appears in the above-identified patent and that said Letters Patent is hereby corrected as shown below:

In the Claims

In Column 14, Line(s) 58, Claim 7, after "claim 1", insert --,--.

In Column 15, Line(s) 1, Claim 8, after "claim 1", insert --,--.

In Column 15, Line(s) 10, Claim 9, after "claim 8", insert --,--.

In Column 15, Line(s) 15, Claim 10, after "claim 1", insert --,--.

In Column 15, Line(s) 20, Claim 11, after "claim 10", insert --,--.

In Column 16, Line(s) 22, Claim 16, after "claim 14", insert --,--.

In Column 16, Line(s) 26, Claim 17, after "claim 14", insert --,--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*